US009462490B2

(12) United States Patent
Jodlauk et al.

(10) Patent No.: US 9,462,490 B2
(45) Date of Patent: Oct. 4, 2016

(54) MAPPING OF POSITION DATA FOR A NETWORK SERVICE IN A CELLULAR TELECOMMUNICATIONS NETWORK

(75) Inventors: Gordian Jodlauk, Würselen (DE); Heiko Perkuhn, Bonn (DE); Rene Rembarz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/351,243

(22) PCT Filed: Oct. 12, 2011

(86) PCT No.: PCT/EP2011/067788
§ 371 (c)(1),
(2), (4) Date: Apr. 11, 2014

(87) PCT Pub. No.: WO2013/053388
PCT Pub. Date: Apr. 18, 2013

(65) Prior Publication Data
US 2014/0274129 A1 Sep. 18, 2014

(51) Int. Cl.
| | | |
|---|---|---|
| *H04W 24/00* | (2009.01) | |
| *H04W 24/02* | (2009.01) | |
| *H04W 64/00* | (2009.01) | |
| *H04W 8/02* | (2009.01) | |
| *H04W 4/02* | (2009.01) | |

(52) U.S. Cl.
CPC ............... *H04W 24/02* (2013.01); *H04W 8/02* (2013.01); *H04W 64/00* (2013.01); *H04W 4/02* (2013.01)

(58) Field of Classification Search
CPC ..... H04W 24/02; H04W 4/02; H04W 64/00; H04W 8/02
USPC ...................... 455/456.1–456.6, 414.1–414.4
See application file for complete search history.

(56) References Cited

U.S. PATENT DOCUMENTS

| | | | | |
|---|---|---|---|---|
| 7,801,533 | B2 * | 9/2010 | Maanoja et al. ........... | 455/456.1 |
| 2004/0198397 | A1 * | 10/2004 | Weiss ......................... | 455/456.5 |
| 2006/0017612 | A1 * | 1/2006 | Nagatani ............... | G01S 5/0027 342/357.64 |
| 2006/0079244 | A1 * | 4/2006 | Posner .................. | H04W 60/04 455/456.1 |
| 2007/0135089 | A1 | 6/2007 | Edge et al. | |
| 2008/0235230 | A1 * | 9/2008 | Maes .................... | H04M 7/006 |
| 2011/0176523 | A1 * | 7/2011 | Huang et al. ................. | 370/338 |
| 2012/0258715 | A1 * | 10/2012 | Souissi et al. ................ | 455/436 |
| 2013/0217419 | A1 | 8/2013 | Jodlauk et al. | |

OTHER PUBLICATIONS

International Search Report and Written Opinion of the International Searching Authority, PCT Application No. PCT/EP2011/067788, Jun. 28, 2012.

(Continued)

*Primary Examiner* — Wayne Cai
(74) *Attorney, Agent, or Firm* — Myers Bigel & Sibley, P.A.

(57) ABSTRACT

A system providing a network service in a cellular telecommunications network, the system comprising one or more processing entities that are configured: to receive first information identifying a mobile terminal being a party to the network service; to receive second information comprising information identifying the mobile terminal being a party to the network service; to map the information identifying the mobile terminal contained in the second information to the first information; and to map the second information to information indicating a position of said mobile terminal.

20 Claims, 3 Drawing Sheets

(56) References Cited

OTHER PUBLICATIONS

International Preliminary Report on Patentability, PCT Application No, PCT/EP2011/067788, Jan. 21, 2014.
3GPP, Technical Specification, "3rd Generation Partnership Project; Technical Specification Group Services and System Aspects; Functional stage 2 description of Location Services (LCS) (Release 10)", 3GPP TS 23.271 V10.2.0 (Mar. 2011), 169 pp.
3GPP, Technical Specification, "3rd Generation Partnership Project; Technical Specification Group Core Network and Terminals; Mobile Application Part (MAP) specification (Release 11)", 3GPP TS 29.002 V11.0.0 (Sep. 2011), 953 pp.
3GPP, Technical Specification, "3rd Generation Partnership Project; Technical Specification Group Radio Access Network; Stage 2 functional specification of User Equipment (UE) positioning in UTRAN (Release 10)", 3GPP TS 25.305 V10.0.0 (Sep. 2010), 80 pp.
Vodafone, "Problem with SGSN location reporting behavior with and without an Iu 'connection' to the UE"; 3GPP TSG-SA WG2; Tdoc S2-020252, Phoenix, USA, Feb. 2002, 7 pp.
802.11-2012—IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications. *IEEE SA-*. N.p., n.d.

* cited by examiner

MAPPING OF POSITION DATA FOR A NETWORK SERVICE IN A CELLULAR TELECOMMUNICATIONS NETWORK

CROSS REFERENCE TO RELATED APPLICATION

This application is a 35 U.S.C. §371 national stage application of PCT International Application No. PCT/EP2011/067788, filed on 12 Oct. 2011, the disclosure and content of which is incorporated by reference herein in its entirety. The above-referenced PCT International Application was published in the English language as International Publication No. WO 2013/053388 A1 on 18 Apr. 2013.

TECHNICAL FIELD

The present invention relates to a system for providing a network service in a cellular telecommunications network, a network entity as part of such a system, a method of operating the network entity, as well as to a related computer program and a computer program product. More particularly, the present invention relates to mapping information to information that indicates a position of a mobile terminal.

BACKGROUND

It is known to provide so-called Location Based Services (LBS) in cellular communication networks, such as a cellular wireless telephone network. Such services typically comprise a mechanism for estimating the location of a mobile terminal, e.g. with the help of a Global Positioning System (GPS, Galileo, Glonass) or a Mobile Positioning System (MPS) that may use Cell-ID information or algorithms based on timing advances and on triangulation for determining the position of a mobile terminal. Said LBS mechanisms are known to enable content delivery based on the location of the user (mobile terminal). Based on the knowledge of the mobile terminal's location, specific location based services can be offered to said mobile terminal, e.g. alert messages for upcoming road traffic hazards or indications toward deviations to avoid traffic jams.

The actual locations of the mobile terminals, or at least information indicating the respective locations, that the location based network services may rely upon are usually kept in some database being updated by means of location updates sent from the mobile terminals. Further, in order to be able to send specific information to these location based selected mobile terminals, there will be also an association of the location data to identification data of the respective mobile terminals, for example the respective telephone numbers for sending and addressing messages thereto.

However, such conventional concepts for providing localized network services in cellular communications networks employ a dedicated generation and retrieval of position data of the mobile terminals in that, for example, the mobile terminals have equipment for determining a location from satellite based services (GPS, Galileo, Glonass) and provide the network service provision side with this information so that the respective location database can be kept up-to-date. Alternatively, the network infrastructure may need to employ the aforementioned MPS to determine the terminals' locations and to update the location database.

Thus, the determination, generation, and retrieval of such dedicated position data involve not only processing and energy resources on the mobile terminal side, but also communication and processing resources on the network side. For example, satellite position signals have to be retrieved and processed on the mobile terminal, respective information has to be compiled and has to be sent over the network to the respective network entity for being incorporated and/or processed into/by the location database.

Moreover, the accuracy of position information retrieved from f satellite-based positioning systems is usually rather high and conventionally achieves position errors well below 10 meters. This accuracy is obtained as an inherent feature of satellite-based positioning systems, and a reduction of position information accuracy usually does not result in a substantial lowering of processing and/or network communication resources.

At the same time, however, network services that employ location information of mobile terminals may not require such high accuracy position information and may not at all make use of this high precision information. For example, the determination of whether a certain mobile terminal is to receive a location based network service or not, or what specific location based network service is to be provided to the mobile terminal may only require coarse information on the position of the mobile terminal. It may be fully sufficient to retrieve information on whether or not a certain mobile terminal is inside or outside a given geographical zone or area. An accuracy of such information reaching below several meters may be of now benefit to the provision and operation of the network service.

It is thus an object of the present invention to provide a network service to mobile terminals of a cellular telecommunications network that involves positional information of the mobile terminals and that reduces the amount of required processing and/or communication resources. This on both sides of the system, namely on the network side and on the mobile terminal side.

SUMMARY

The above-mentioned problems are solved by the subject-matter of the independent claims. Further preferred embodiments are defined in the dependent claims.

According to an aspect of the present invention, a system is proposed for providing a network service in a cellular telecommunications network, the system comprising one or more processing entities that are configured: to receive first information identifying a mobile terminal being a party to the network service; to receive second information comprising information identifying the mobile terminal being a party to the network service; to map the information identifying the mobile terminal contained in the second information to the first information; and to map the second information to information indicating a position of said mobile terminal.

According to another aspect of the present invention, a network entity is proposed comprising a processing entity that is configured: to receive first information identifying a mobile terminal being a party to a network service; to receive second information comprising information identifying the mobile terminal being a party to the network service; to map the information identifying the mobile terminal contained in the second information to the first information; and to map the second information to information indicating a position of said mobile terminal.

According to another aspect of the present invention, a method of operating a network entity is proposed comprising the steps: receiving first information identifying a mobile terminal being a party to a network service; receiving second information comprising information identifying the mobile terminal being a party to the network service; mapping the information identifying the mobile terminal contained in the second information to the first information; and mapping the second information to information indicating a position of said mobile terminal.

According to yet further aspects of the present invention, a computer program and a computer program product comprising such a computer program are provided so that the computer code parts of the computer program, when executed by a processing entity, performs the steps of the method aspects of the present invention.

BRIEF DESCRIPTION OF THE DRAWINGS

Embodiments of the present invention, which are presented for better understanding the inventive concepts but which are not be seen as limiting the invention, will now be described with reference to the Figures in which.

DETAILED DESCRIPTION

In general, embodiments of the present invention provide the use of data that is available through other sources on the network side, that are external to the network service side (e.g. a GeoMessaging system), through information present in certain elements of the cellular network or available through sources such as a floating car data system (FCD, XFCD), ITS Roadside Stations, etc. This information can also be used to update the client's or terminal's position in a location grid. Using such external sources may allow for switching off or reducing the client-based position signalling and thereby reduce the signalling and optimize network load.

Figure 1:
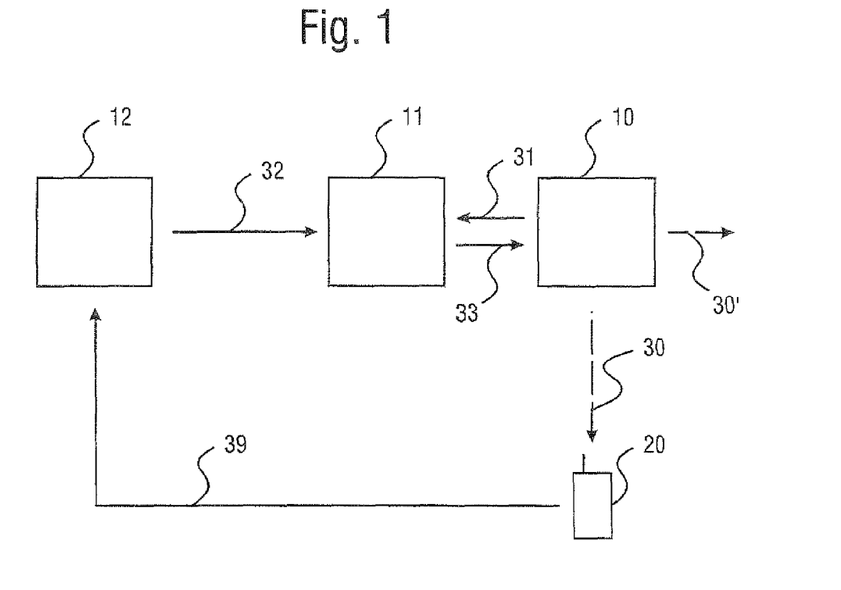
FIG. 1 shows a schematic representation of a system providing a network service according to an embodiment of the present invention.

FIG. 1 shows a schematic representation of a system providing a network service according to an embodiment of the present invention. Specifically, this embodiment includes a network entity 10 that provides a location based network service 30. This service may comprise sending data, such as information messages or alert warnings, to a mobile terminal 20 based on its actual location. In other words, the mobile terminal 20 will receive the network service, say, receive a road traffic hazard warning, if inside a specific zone around the road hazard location, e.g. if the mobile terminal's distance from an accident is less than 1 kilometer.

In general, however, a location-based network service 30' may well only use the mobile terminals' location without providing any direct service to the terminals but to some other entity receiving and processing the terminals' position data. For the latter, an example may be an entity operated by some traffic authority to monitor road load and vehicle density by observing the number of mobile terminals in some given geographical area. In such cases the mobile terminal 20 does not receive any direct service 30 but is the subject of the network service 30'. However, regardless of whether the terminals receive information as part of the network service or the terminals are just subjects of the network service, one respective mobile terminal (or: client) 20 is a party to the network service.

According to this embodiment of the present invention, a further network entity 11 is included that provides the network entity 10 with information indicating the position of the mobile terminal 20, whereby no direct provision of such information from the terminal 20 to the entity 10 takes place. In the case of a network service 30' that does not provide any data to the mobile terminal 20 itself there will be thus no direct communication involved between the terminal 20 and the network entity 10 that provides the location-based network service.

The network entity 11 receives first information 31 from the entity 10, said first information 31 identifying the mobile terminal 20 being party to the network service 30('). In this way, the entity 11 is provided with information that identifies mobile terminals 20 that are of interest to the network service 30('). The entity 11 receives further second information 32. Information 32 also comprises information identifying a mobile terminal 20 being party to the network service 30('). In this way, the network entity 11 can map the information identifying the mobile terminal 20 comprised by the second information 32 to said first information 31. In other words, the network entity 11 can associate the information 32 to a given mobile terminal 20 known to the entity 10 from the first information 31 or information from which said first information 31 was compiled.

The network entity 11 further maps said second information 32 to information indicating the position of the mobile terminal 20. This positional information is then forwarded as information 33 to the entity 10. In this way, the entity 10 can request information on the position of a given mobile terminal 20 without directly interacting with the mobile terminal 20 and/or receiving direct location/position information from the mobile terminal 20.

As can be seen from FIG. 1, said second information 32 is retrieved from entity 12. This entity may represent any information source in a communication network or coupled thereto that has knowledge of positional and identification information of a mobile terminal party to the network service. The entity 12 may have this knowledge from information 39 being either directly or indirectly received from the mobile terminal 20.

Figure 2:
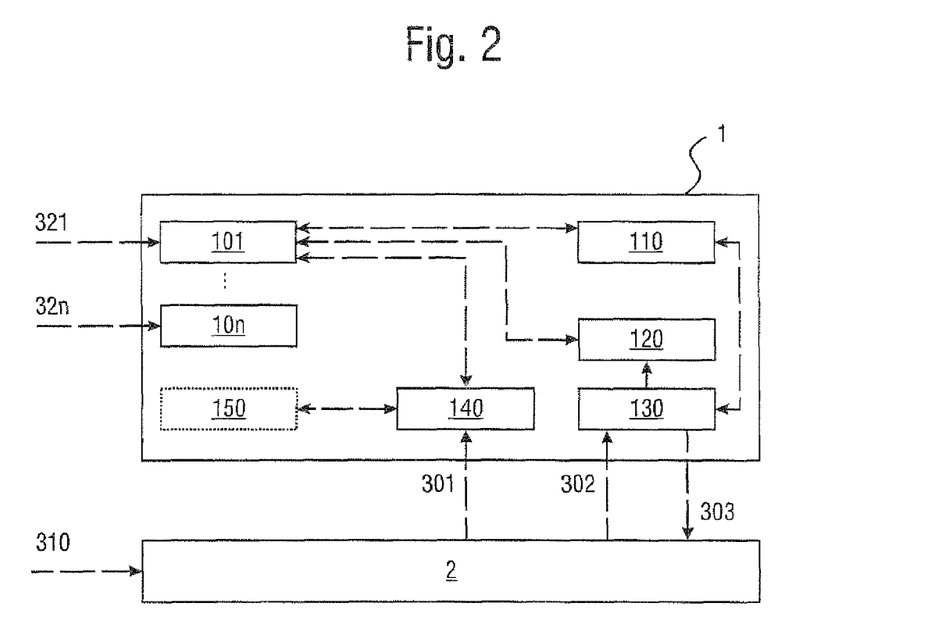
FIG. 2 shows a schematic representation of a network entity providing a network service to a mobile terminal according to another embodiment of the present invention.

FIG. 2 shows a schematic representation of a network entity providing a network service to a mobile terminal according to another embodiment of the present invention. A client (mobile terminal) 2 initially registers 301 to the system by contacting a so-called vehicle session manager (VSM) 140 using a primary identity "ID0". Direct location updates may be supplied to the GeoMessaging 1 system using a "Loc" message 302 sent to the location manager "L0" 130, which contains the current position "P0" and the identity "ID0" of the client 2. L0 subsequently updates a grid database 120 and sends back, if applicable, the information about the current tile in a "Grid" message 303. The concept of the direct location/position messaging via message 302 may be identifies as a client-based approach, that typically involves satellite data 310, potentially assisted by network functions such as the Mobile Positioning System (MPS).

In line with the embodiments of the present invention, the term network service is to be understood as the entirety of services and functions within a cellular communication network that, for example, as part of it includes a geographical service to a mobile network operator (MNO) or other service operators on a provider side, and a localized information service to the mobile terminals on the user side. On the operator side, the term geographical service should be understood as the basic service entity that makes use from the network service, whereas on the user side the term localized information service should be understood as the basic service entity that makes use from the network service.

Examples for the localized information service include services that provide mobile terminals with information, based on their respective locations, such as traffic hazard warnings or specific route deviation proposals when the respective mobile terminal's location results in a possible involvement with such traffic hazards and/or traffic jams. Examples for the geographical service include services that make use from the grid field information alone for determining mobile terminal density (e.g. corresponding to a vehicle density) within a specific geographical area and/or services for providing traffic authorities with information on such vehicle densities on specific motorways or in the vicinity of a specific junction. From the latter examples it again becomes clear that the geographical service may not necessarily involve sending of messages or broadcasting of information to the mobile terminals at all.

As a further example, said geographical service can also be provided to the outside of the cellular communication network, wherein the outside is to be understood as leaving the contractual area between an MNO and the subscribers to the operator's services (i.e. the users of the mobile terminals). Since embodiments of the present invention allow for providing said geographical service without the need of revealing sensitive information to third parties, said outside of the cellular telecommunications network may also include these third parties, i.e. the geographical service can be provided to these parties while keeping any sensitive information inside the required network limits (e.g. cellular telecommunication network as such and/or the MNO'S intranet). Further, the network service may expose an interface to a multitude of services (MNO internal and external), which allows sending messages into a spatial area without knowing individual client's locations. Said interface may be regarded as the gateway to the users of said geographical service.

According to this embodiment, however, position information on the client 2 is also retrieved independent from any direct messaging 302 from further means as described in greater detail below. Specifically, external sources are employed for receiving second information 321 ... 32n that provides positioning information "P1" to "Pn" for client 2 (it should be noted that for the general case a single second information 321 may be sufficient and "P2" to "Pn" are to be identified as top-up information sources). In any way, said information may be in a format which is usually specific to the source or positioning method used. The external source associates the positioning information to the client and refers to the client by employing an identifier "IDi" (i=1 to n), which again can be different from the primary identity "ID0" received or established directly from the client 2 during registering 301.

The second information 321 ... 32n is received by the additional location managers "Li" 101 ... 10n (again, for only one second information 321 there will be only one manager 101). The manager 10i maps the identity "IDi" to the primary identity "ID0" by contacting the VSM 140 that either knows the identities through the registration or consults an optional external identity mapper 150. Manager 101 also translates the positions "Pi" into a suitable format that enables the grid database 120 to update the position of the client 2.

As already indicated, additional location managers 102 ... 10n ("L2" ... "Ln") can be used if a multitude of external sources exists. The different location managers 10i are controlled by a localization controller 110. The most important capability of the controller 110 is to enable, disable or reduce the amount of positioning information supplied by the different location managers 10i. When applicable, the location managers 10i can contact their information sources and ask for reduction of the amount of positioning data sent.

Specifically, L0 130 may contact the client 2 and instruct it to start, stop, or reduce the direct position signalling 302 over the air. For example, the location manager 130 may have been made aware of an external source for location information via manager 101, and may thus instruct the client 2 to stop any direct location signalling 302. On the other hand, external sources may have become unavailable so that any one of a plurality of location managers 101 is no longer able to update the database 120, and thus managers 130 may instruct the client 2 to resume direct location messaging 302 albeit this possibly involves an increase in the overall required processing/communication resources.

The following examples may serve as for the above-mentioned external sources (or as the entity 12 as described in conjunction with FIG. 1):

A first external source for providing said second information 32, 32i may be the so-called floating car data (FCD) technology that is based on sending position data of a vehicle and a corresponding timestamp to a service provider, typically using cellular communication. This data is then used to make predications of traffic flows and density, or for other value-added services. Further, so-called extended floating car data (XFCD) may include additional information collected from sensors in the car, such as speed, heading or the destination of the vehicle. More advanced systems may also include sensor data such as traction information that may indicate an icy road. FCD, XFCD and comparable systems already require that position data is transferred to a backend system. This data could easily be included into the positioning done for GeoMessaging 1 without the need to transfer duplicate information, such as the direct location messaging 302.

Another example lies in the area of intelligent transport systems (ITS), in which there are different communications paradigms, two common ones being vehicle-to-infrastructure (V2I) and infrastructure-to-vehicle (I2V) communication. A typical use case is the dissemination of traffic information, e.g. information about a traffic jam. Cellular communication is often a suitable medium for this communication.

However, there is also the option to use ad-hoc communication (e.g. using the method defined in IEEE 802.11p) with dedicated road-side equipment (so-called ITS Roadside Stations, IRS). The position of the IRS is known, and the vehicle is identified by a certain identifier. In many deployments, the IRSs have a connection to backend systems, e.g. to download traffic information that is subsequently broadcasted to vehicles. Such IRSs may also transfer the positioning information, e.g. own position and IDs of vehicles in proximity, to a GeoMessaging system over the existing link.

Further, there may be available various positioning methods defined in 3GPP that all use information available from the Radio Access Network (RAN). A simple method is obtaining the cell ID of the radio cell where the mobile terminal/client is currently attached to. The accuracy of the position corresponds to the radius of coverage of the cell. More advanced techniques make use of additional information, e.g. timing advance. In 3GPP TS 45010, the so called timing advance is defined as the "signal sent by the BTS to the MS (mobile station, mobile terminal, client) which the MS uses to advance its timings of transmissions to the BTS so as to compensate for propagation delay." The corresponding "timing advance" parameter (TA) is sent to every terminal by the base station (BS). The value of TA can be used to estimate the distance of the terminal from the center of the cell, which increases the average accuracy of the positioning method. One unit of 3.69 µs equates 550 m. Another way to estimate the distance to the BS is measuring the received signal strength (RSS). To increase the accuracy further, the Round-Trip-Time-of-Flight (RToF) from three BS can be used ("Triangulation"). The terminal receives signals from at least three BS, and the terminal should be "active". Possible accuracies using triangulation lie in the range of approximately 50 m.

A further alternative method for positioning makes use of WiFI SSIDs received by the MS. Requirements are that the mobile terminal is equipped with WiFi radio and that someone has once recorded the SSIDs and their corresponding position. With this information stored in a database, it is possible to get the position of a mobile terminal when it sends the received SSID to a server that looks up the SSID in a database and sends back the corresponding position e.g. in GPS coordinates with a radius of inaccuracy, typically 30 to 50 meters.

Additionally, the system may also be configured to calculate the information indicating a position of the mobile terminal from previous position information based on the second information. In such a case, the second information may just comprise information that no recent information indication the position of the mobile terminal is available. This may be determined, for example, an external source by observing some time to live of the information indication the position of the mobile terminal. The so received second information may the trigger the calculation/estimation of the terminal's position by referring to previous position data, possible including information on speed, destination, and heading of the terminal. If the mobile terminal is vehicle mounted such information can be provided through an on-board navigational system.

Figure 3A:
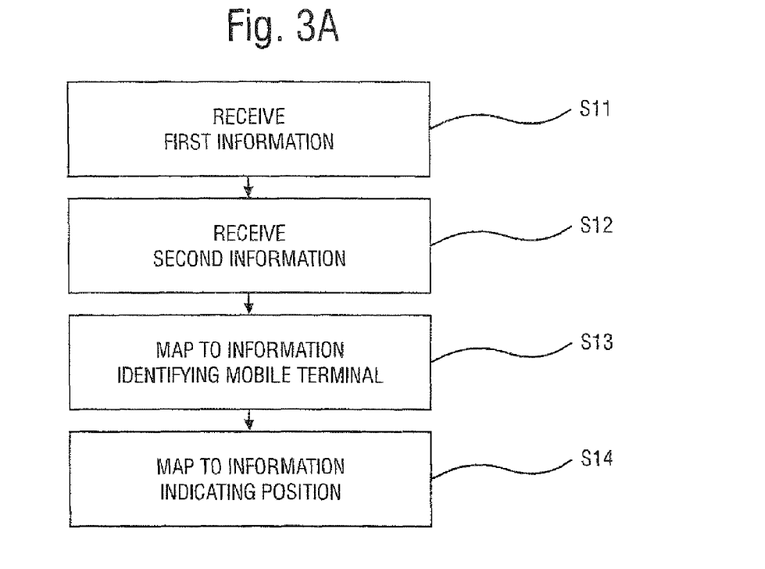
FIGS. 3A and 3B show flow charts of method embodiments of the present invention.

FIG. 3A shows a flow chart of a method embodiment of the present invention. Specifically, the method may be performed for operating a network entity or for operating a system in a cellular telecommunications network. According to such embodiments, a network entity receives in a step S11 first information identifying a mobile terminal being a recipient of a network service. Then, in step S12 second information is received comprising information identifying the mobile terminal being a recipient of the network service. In step S13 the information identifying the mobile terminal contained in the second information is mapped to the first information, and in step S14 the second information is mapped to information indicating a position of said mobile terminal.

Figure 3B:
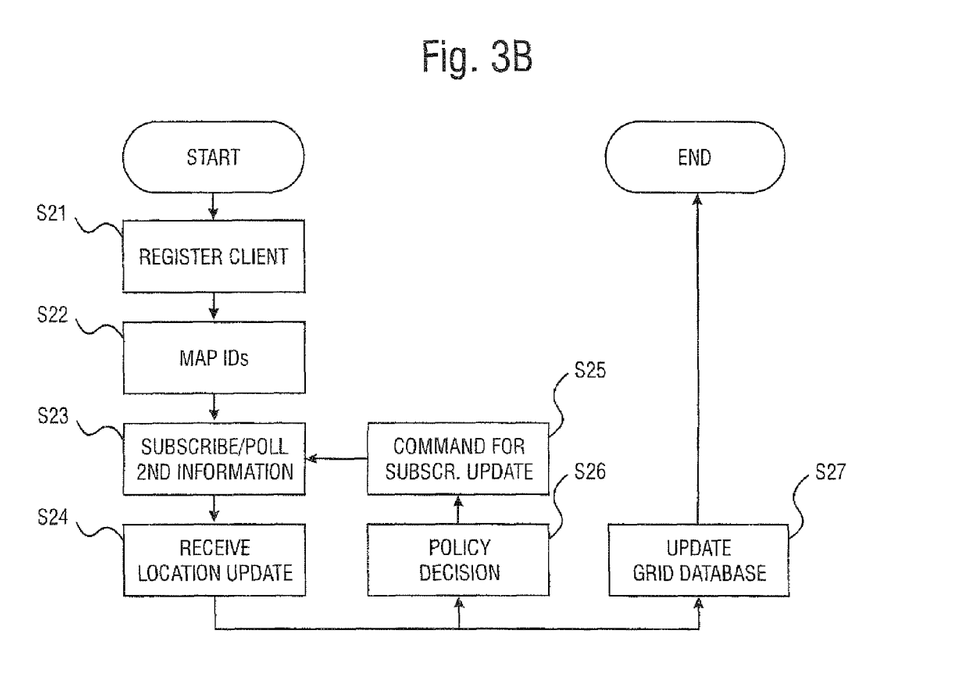

FIG. 3B shows a flow chart of another method embodiment of the present invention. Specifically, the method may be performed for operating a network entity or for operating a system in a cellular telecommunications network. In step S21 a client initially registers to the entity/system by contacting the Vehicle Session Manager (VSM) using a primary identity ID0. From now on the client may continue to supply location updates to the GeoMessaging system using a Loc message sent to the Location Manager L0, which contains the current position P0 and the identity ID0. The location Manager L0 subsequently updates the grid database and sends back, if applicable, the information about the current tile in a Grid message.

According to this embodiment, the GeoMessaging system is enabled to handle additional, external positioning sources and implements additional Location Manager entities Li for each external source. The position information format and identifier IDi can be different from each other and especially from the primary identity ID0. After the registration of the client with primary identity ID0 the VSM maps in a step S22 ID0 to all other identifiers. For this purpose the VSM may also contact an external ID-Mapper, e.g. to map an IP address to a MSISDN.

With the available identity IDi, the Location Manager Li can start to request location information for the client from an external source in step S23. The simplest approach is polling for the required information each time a certain time interval has elapsed. Another alternative that at the same time provide improved efficiency is to subscribe for notifications according to some criteria, e.g. time based or distance based. A suitable subscription criterion for the grid based GeoMessaging is called "geo fence" or spatial trigger which allows to receive a notification when the client leaves the current tile of its location. This can be the default method for the client based localization and L0.

An optimization may be conceived in a way that the client extrapolates the subscription to the next tile unless L0 decides to change the subscription due to changed grid spacing in the new location, using a Grid message sent to the client.

From now on all location managers Li may receive location information about the client regularly and according to the subscription criteria used and update the grid database accordingly in step S24. In addition, if the client cannot provide a position in exceptional cases, the system can submit location information to the client.

At the same time the Localization Controller LC evaluates the available location information and derived metadata according to given policies. The result of this evaluation is a decision in step S26 which location information source should be used to which degree. For this purpose the LC can command in step S25 the Location Managers L to change their subscriptions for the client accordingly. Although the LC can implement arbitrary policies, one efficient policy can be to reduce the position signalling over the air from L0 (i.e. direct provision of location information from the client/terminal). Subsequent policies could be cost based and reduce the signalling from network based position information sources as much as possible while keeping a sufficient level of accuracy and quality. In any way, the grid database is updated in step S27 by using information directly received from the client/terminal and/or information mapped from second information received from external sources.

According to further embodiments, the system or one or more processing entities are configured to adapt the subscription policy specifying which one of the second information received from the plurality of external entities is used for mapping. Said policy may consider one or more criteria selected from time intervals, time of day, distance, geo fencing, terminals leaving a grid field, accuracy vs. average mapping, change subscriptions policy including the selection of a source, reduction of (direct) position signalling, cost, overall accuracy, and quality.

By using available (external) sources for positioning information on the network side it is thus possible to significantly reduce the signalling data traffic for localization on the radio network part. External sources for positioning information may support localization in locations or at times where GPS based localization is not available. The likeliness for "blind spots" can be reduced significantly. Specifically when a client joins the system it might be in a location where the client based localization does not work (e.g. GPS in a parking garage). In that case the location information from the external sources can be used to quickly provide an initial position to the client.

Figure 4:
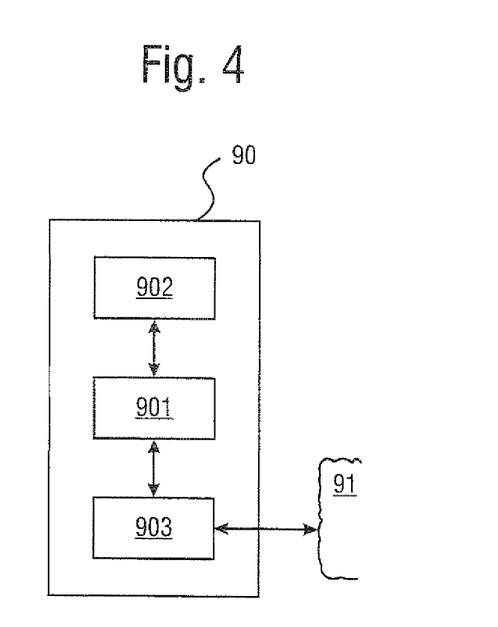
FIG. 4 shows a schematic representation of a network entity according to another embodiment of the present invention.

FIG. 4 shows a schematic representation of a network entity according to another embodiment of the present invention. As shown in FIG. 4 a network entity 90 comprises a processing unit 901 and a memory unit 902. In the memory unit 902 there are memory sections storing data and/or code in order to provide the functions of the embodiments of the present invention. The network entity 90 further comprises a communication unit 903 adapted to communicate via a network 91 to other entities of the described system and/or mobile terminals or clients. The network 91 may be a network coupled to a cellular telecommunications network or the Internet, or may already represent one or both of the latter as such.

Although detailed embodiments have been described, these only serve to provide a better understanding of the invention defined by the independent claims, and are not to be seen as limiting.

The invention claimed is:

1. A system providing a network service in a cellular telecommunications network, the system comprising one or more network entities that each comprise a processing unit and a memory unit, wherein the one or more network entities are configured to perform operations comprising:
receiving first information identifying a mobile terminal being a party to the network service;
receiving second information comprising information identifying the mobile terminal being a party to the network service;
mapping the information identifying the mobile terminal contained in the second information to the first information; and
mapping the second information to information indicating a position of said mobile terminal,
wherein the one or more network entities are configured to send a subscription request to an external entity for receiving the second information regularly according to subscription criteria, and
wherein the second information is received by the one or more network entities from the external entity when a position of the mobile terminal leaves a location area, and
wherein the one or more network entities are configured to instruct the mobile terminal to stop, and/or reduce direct location signaling, in response to the one or more network entities determining that the external entity provides location information to the one or more network entities.

2. The system according to claim 1, wherein the first information and the second information comprise any one or more of an MSISDN, an IP-address, a MAC-address, and a car registration of a vehicle.

3. The system according to claim 1, wherein the one or more network entities are configured to instruct the mobile terminal to start sending direct location signaling, in response to the one or more network entities determining that the external entity is unable to provide location information.

4. The system according to claim 1, wherein the second information is received by the one or more network entities from the external entity in response to a spatial trigger comprising the mobile terminal leaving a tile of a grid location.

5. A network entity comprising a processing entity that comprises a processing unit and a memory unit, wherein the processing entity is configured to perform operations comprising:
receiving first information identifying a mobile terminal being a party to a network service;
receiving second information comprising information identifying the mobile terminal being a party to the network service;
mapping the information identifying the mobile terminal contained in the second information to the first information;
mapping the second information to information indicating a position of said mobile terminal,
sending a subscription request to an external entity for receiving the second information regularly according to subscription criteria,
wherein the second information is received from the external entity when a position of the mobile terminal leaves a location area, and
wherein the network entity is configured to instruct the mobile terminal to stop, and/or reduce direct location signaling, in response to the network entity determining that the external entity provides location information to the network entity.

6. The network entity according to claim 5 wherein the processing unit is configured to refer to a data base listing the first information relative to the information identifying the mobile terminal contained in the second information.

7. The network entity according to claim 6, wherein the data base is kept in an external entity that is outside and networked to the system.

8. The network entity according to claim 5, wherein the second information comprises any one or more of a cell id, time advance information, a time stamp, geographical position information, geographical position coordinates, speed information, heading information, destination information, and an SSID.

9. The network entity according to claim 5, wherein the processing unit is configured to calculate the information indicating the position of the mobile terminal from previous position information based on the second information.

10. The network entity according to claim 9, wherein the processing unit is configured to receive the second information from a plurality of external entities.

11. The network entity according to claim 10, wherein the processing unit is configured to adapt a subscription policy specifying which one of the second information received from the plurality of external entities is used for mapping.

12. The network entity according to claim 5, wherein the information indicating a position of the mobile terminal indicates the position in a grid that covers at least a portion of a geographical area with grid fields, framed by grid lines and spaced by a grid spacing.

13. The network entity according to claim 5, wherein the processing unit is configured to provide the information indicating a position of the mobile terminal to said mobile terminal.

14. The network entity according to claim 5, wherein the one or more network entities are configured to instruct the mobile terminal to start, stop, and or to reduce location signalling for providing the processing unit with information indicating a position of the mobile terminal.

15. The network entity of claim 5, wherein the first information and the second information comprise any one or more of an MSISDN, an IP-address, a MAC-address, and a car registration of a vehicle.

16. The network entity of claim 5, wherein the second information is received by the one or more network entities from the external entity in response to a spatial trigger comprising the mobile terminal leaving a tile of a grid location.

17. A method of operating a network entity that comprises a processing unit and a memory unit, wherein the network entity is configured to perform operations comprising:
- receiving first information identifying a mobile terminal being a party to a network service;
- receiving second information comprising information identifying the mobile terminal being a party to the network service;
- mapping the information identifying the mobile terminal contained in the second information to the first information;
- mapping the second information to information indicating a position of said mobile terminal,
- sending a subscription request to an external entity for receiving the second information regularly according to subscription criteria,
- wherein the second information is received from the external entity when a position of the mobile terminal leaves a location area, and
- wherein the network entity is configured to instruct the mobile terminal to stop, and/or reduce direct location signaling, in response to the network entity determining that the external entity provides location information to the network entity.

18. The method of claim 17, wherein the first information and the second information comprise any one or more of an MSISDN, an IP-address, a MAC-address, and a car registration of a vehicle.

19. A non-transitory computer program product comprising computer code parts for performing the method of claim 17 when executed by a processing entity.

20. The method of claim 17, wherein the second information is received by the one or more network entities from the external entity in response to a spatial trigger comprising the mobile terminal leaving a tile of a grid location.

* * * * *